(12) United States Patent  
Irie

(10) Patent No.: US 8,857,718 B2  
(45) Date of Patent: Oct. 14, 2014

(54) INFORMATION TERMINAL AND COMPUTER READABLE MEDIUM

(71) Applicant: Casio Computer Co., Ltd., Tokyo (JP)

(72) Inventor: Tomonori Irie, Tokyo (JP)

(73) Assignee: Casio Computer Co., Ltd, Tokyo (JP)

( * ) Notice: Subject to any disclaimer, the term of this patent is extended or adjusted under 35 U.S.C. 154(b) by 0 days.

(21) Appl. No.: 13/938,453

(22) Filed: Jul. 10, 2013

(65) Prior Publication Data

US 2014/0021257 A1 Jan. 23, 2014

(30) Foreign Application Priority Data

Jul. 20, 2012 (JP) .................................. 2012-161652

(51) Int. Cl.
G06K 7/10 (2006.01)
G08C 21/00 (2006.01)
G06K 7/14 (2006.01)

(52) U.S. Cl.
CPC .................................... G06K 7/1408 (2013.01)
USPC ..................................... 235/462.07; 235/375

(58) Field of Classification Search
CPC ..... G06K 17/0016; G06K 17/00; G06K 7/14; G06K 7/10; G06F 17/30; G06F 8/65; G06F 8/60
USPC .......................... 235/462.07, 462.1, 375, 487
See application file for complete search history.

(56) References Cited

U.S. PATENT DOCUMENTS 8,505,823 B2 * 8/2013 Bhagwan et al. ........ 235/462.04
2008/0142599 A1 * 6/2008 Benillouche et al. .... 235/462.41

FOREIGN PATENT DOCUMENTS

JP 2008-083843 4/2008
JP 2010-092211 4/2010

* cited by examiner

*Primary Examiner* — Edwyn Labaze
(74) *Attorney, Agent, or Firm* — Amin, Turocy & Watson, LLP

(57) ABSTRACT

An information terminal includes an acquiring unit which scans a symbol to acquire a symbol image; a storage unit which stores configuration information on a decoding method of the symbol for each of applications; a specifying unit which specifies an application of the applications; a reading unit which reads, from the storage unit, the configuration information on the decoding method for the specified application; a setting unit which sets the decoding method in accordance with the read configuration information; and a decoding unit which decodes the symbol image acquired by the acquiring unit on the basis of the set decoding method to acquire symbol data.

10 Claims, 7 Drawing Sheets

FIG. 2

[APPLICATION A]
PROGRAM NAME = App_A.exe
DB FILE = Database1.dat
DB FIELD = PRODUCT CODE
READING CODE = JAN
READING DIGIT NUMBER = 13 DIGITS

[APPLICATION B]
PROGRAM NAME = App_B.exe
DB FILE = Database2.dat
DB FIELD = (STOCK) PRODUCT NAME
READING CODE = Code39
READING DIGIT NUMBER = 10 DIGITS OR LESS

[APPLICATION C]
PROGRAM NAME = App_C.exe
DB FILE =
READING CODE = QR
READING DIGIT NUMBER = 100 DIGITS OR LESS

| SYMBOL DATA | PRODUCT CODE | PRODUCT NAME | IMAGE FILE |
|---|---|---|---|
| 4912345678901 | 10000001 | BLUE SHIRT (S) | 10000001.jpg |
| 4912345678912 | 10000002 | BLUE SHIRT (M) | 10000002.jpg |
| 4912345678923 | 10000003 | BLUE SHIRT (L) | 10000003.jpg |
| ·· | ·· | ·· | ·· |

| SYMBOL DATA | (STOCK) PRODUCT CODE | (STOCK) PRODUCT NAME | STOCK AMOUNT (S) | STOCK AMOUNT (M) | STOCK AMOUNT (L) | STOCK AMOUNT (LL) |
|---|---|---|---|---|---|---|
| xxxxxxxx | 20000001 | BLUE SHIRT | AVAILABLE | AVAILABLE | LITTLE | NONE |
| ·· | ·· | ·· | ·· | ·· | ·· | ·· |

41  42  43  44  45  46  47  40

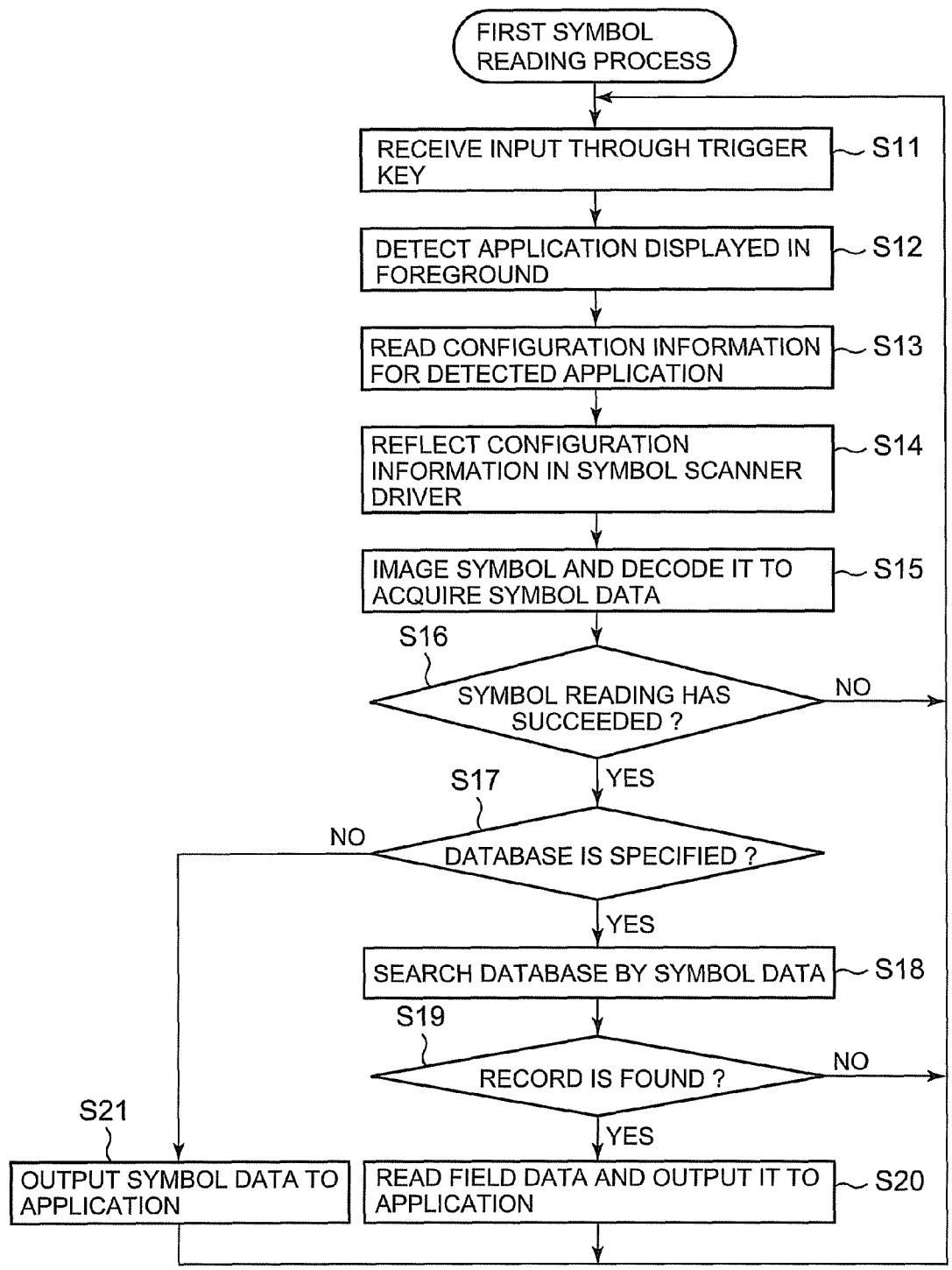

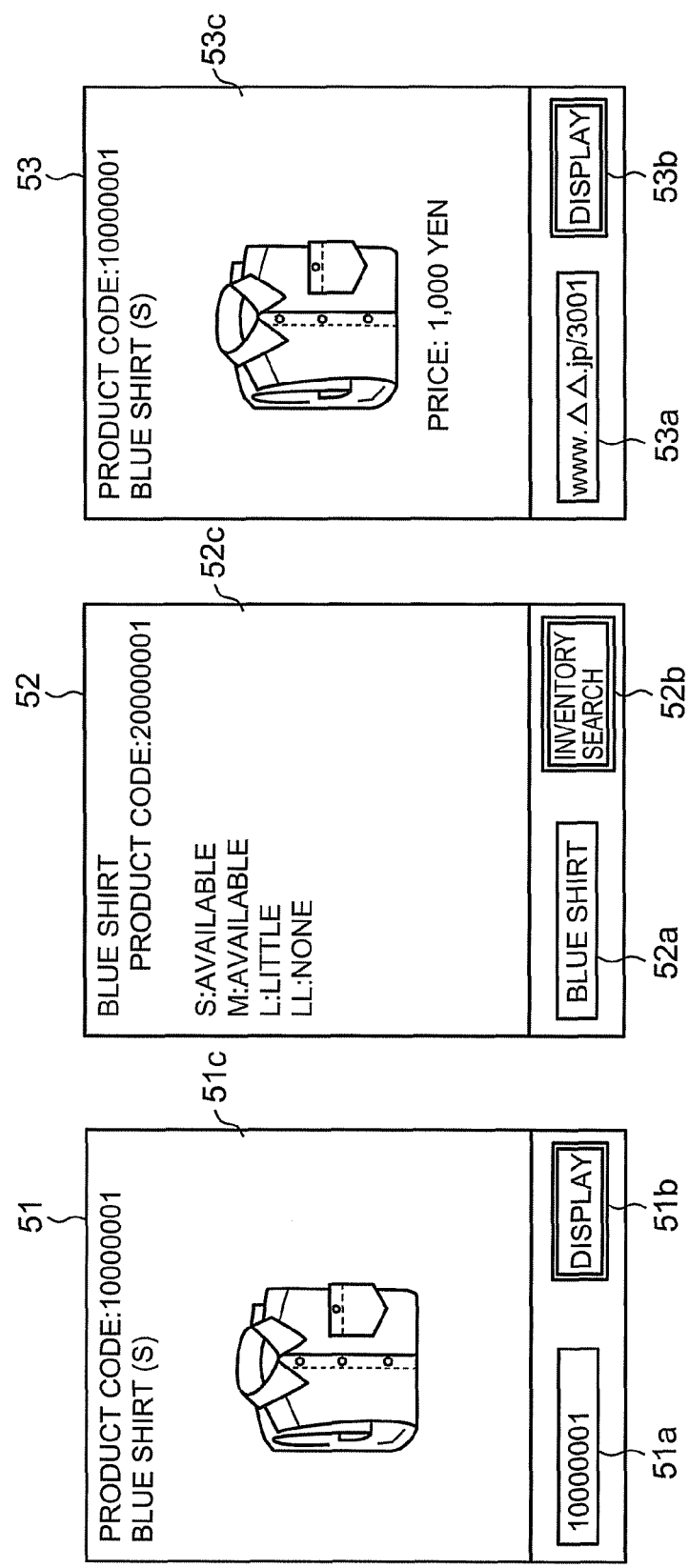

FIG. 6

[APPLICATION A]
PROGRAM NAME = App_A.exe
SCANNING EXECUTION = VALID
DB FILE = Database1.dat
DB FIELD = PRODUCT CODE
READING CODE = JAN
READING DIGIT NUMBER = 13 DIGITS

[APPLICATION B]
PROGRAM NAME = App_B.exe
SCANNING EXECUTION = VALID
DB FILE = Database2.dat
DB FIELD = (STOCK) PRODUCT NAME
READING CODE = Code39
READING DIGIT NUMBER = 10 DIGITS OR LESS

[APPLICATION D]
PROGRAM NAME = App_D.exe
SCANNING EXECUTION = INVALID

INFORMATION TERMINAL AND COMPUTER READABLE MEDIUM

BACKGROUND OF THE INVENTION

1. Field of the Invention

The present invention relates to an information terminal to read a symbol and a computer readable medium.

2. Background Art

Portable information terminals (handy terminals) which include a scanner unit to scan a bar code or two-dimensional code as a symbol have conventionally been known (see Japanese Unexamined Patent Application Publications No. 2010-092211 and No. 2008-083843, for example).

In a handy terminal capable of reading a bar code, for example, the process of reading a bar code and the process to use the read bar code data for business are performed by an exclusively-developed business application.

Such a business application performs various processes depending on the intended use, such as searching for product information on the basis of read bar code data to display it, and checking a server for product information and inventory information to display it.

Application developers have developed such a business application using the scanner unit in the method (1) or (2) below.

(1) Each business application is individually developed using a dedicated bar code scanner library.

(2) With a resident program to read a bar code, bar code data read via a keyboard wedge, for example, is inputted in the input field of a business application.

When developing a business application in the method of (1), however, an application developer needs to learn how to use the dedicated library, which is a great burden on the developer.

Further, when a plurality of business applications are running on the handy terminal at the same time, it is necessary to change an application which uses the scanner unit or to make the scanner unit open/close for each application because the applications cannot use the scanner unit at the same time.

When developing a business application in the method of (2), the setting for bar-code reading cannot be switched depending on the business application in using a plurality of business applications.

Therefore, a common setting available for a plurality of business applications needs to be made.

SUMMARY OF THE INVENTION

An object of the present invention is to read a symbol with a setting corresponding to each application and to simplify the structure of application.

According to a first aspect of the present invention, there is provided an information terminal including: an acquiring unit which scans a symbol to acquire a symbol image; a storage unit which stores configuration information on a decoding method of the symbol for each of applications; a specifying unit which specifies an application of the applications; a reading unit which reads, from the storage unit, the configuration information on the decoding method for the specified application; a setting unit which sets the decoding method in accordance with the read configuration information; and a decoding unit which decodes the symbol image acquired by the acquiring unit on the basis of the set decoding method to acquire symbol data.

According to a second aspect of the present invention, there is provided a non-transitory computer readable medium having stored thereon computer-executable instructions which, when executed, cause a computer to perform steps of: scanning a symbol to acquire a symbol image; storing configuration information on a decoding method of the symbol for each of applications on a storage unit; specifying an application of the applications; reading, from the storage unit, the configuration information on the decoding method for the specified application; setting the decoding method in accordance with the read configuration information; and decoding the symbol image acquired by the scanning of the symbol on the basis of the set decoding method to acquire symbol data.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2 is a view showing a first configuration file;

FIG. 3A is a view showing a product information database;

FIG. 3B is a view showing an inventory information database;

FIG. 4 is a flowchart showing a first symbol reading process;

FIG. 5A is a view showing a display screen of a first application;

FIG. 5B is a view showing a display screen of a second application;

FIG. 5C is a view showing a display screen of a third application;

FIG. 6 is a view showing a second configuration file; and

DETAILED DESCRIPTION OF THE PREFERRED EMBODIMENT

Figure 1:
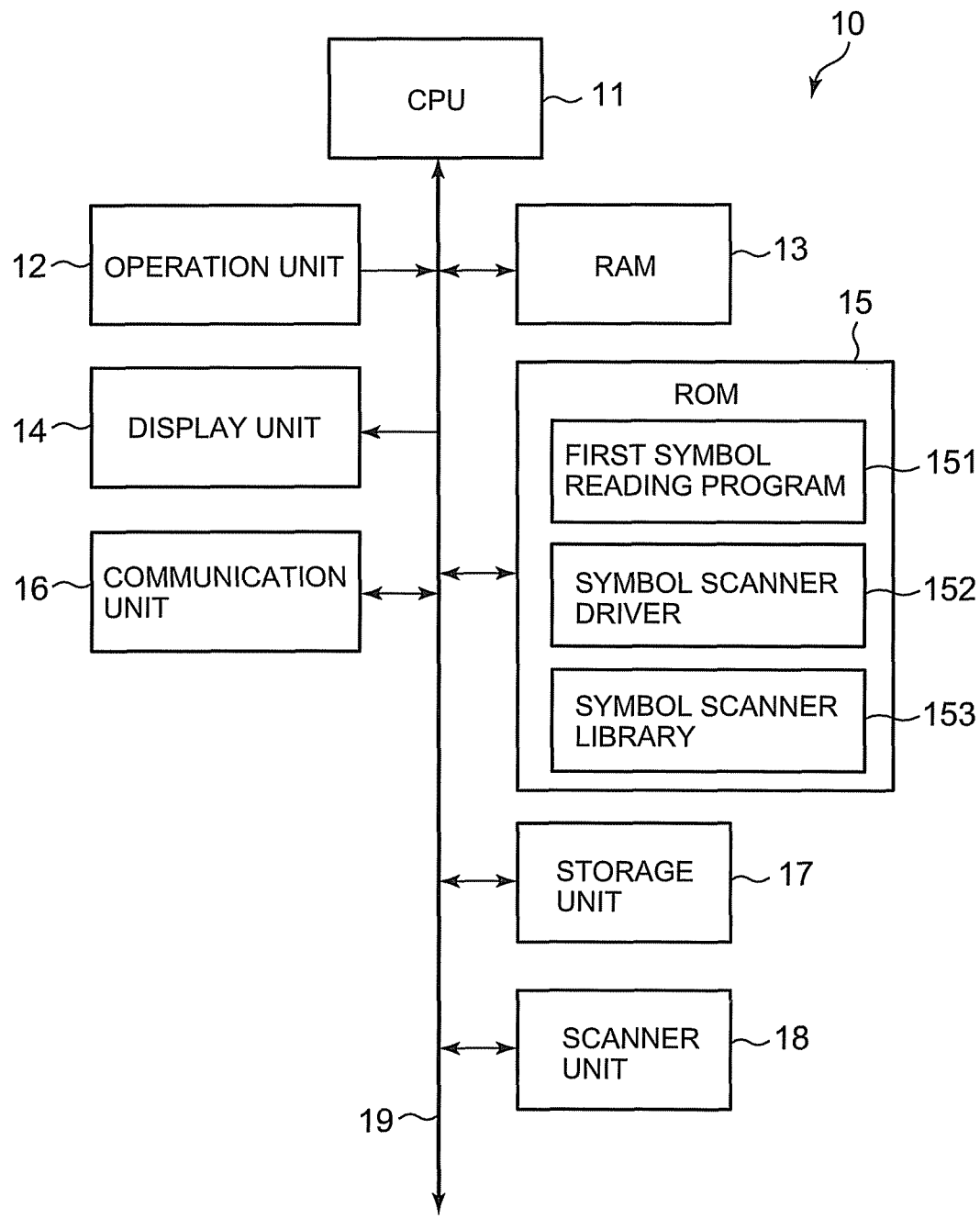
FIG. 1 is a block diagram showing the functional structure of an information terminal of an embodiment of the present invention.

An embodiment and its modification in accordance with the present invention are described in this order below in detail with reference to the drawings.

The present invention, however, is not limited to the example shown in the drawings.

Embodiment

An embodiment in accordance with the present invention is described with reference to FIGS. 1 to 4.

First, the structure of the device of the present embodiment is described with reference to FIG. 1.

FIG. 1 is a block diagram showing the functional structure of an information terminal 10 of the present embodiment.

The information terminal 10 having a symbol reading function is a handy terminal as an information terminal to collect information of products, for example. The information terminal 10, however, is not limited to such a handy terminal but may be another information terminal having the symbol reading function, such as a PDA (Personal Digital Assistant), a smartphone, a mobile phone and a tablet PC (Personal Computer).

The present embodiment is described by taking a case where the information terminal 10 is used for managing products in a clothing shop, but is not limited to such a case. The information terminal 10 is carried by a clerk for use in the shop.

A symbol is attached to each product in the shop for identification of each product.

The symbol is one of a JAN (Japanese Article Number) code, a Code39, as a bar code, and a QR (Quick Response) code (registered trademark) as a two-dimensional code.

The type of symbol attached to each product to be read by the information terminal 10, however, is not limited to these examples.

As shown in FIG. 1, the information terminal 10 includes a CPU (Central Processing Unit) 11 as a decoding unit, a specifying unit, a reading unit, a setting unit, an output unit, a determining unit and a control unit; an operation unit 12; a RAM (Random Access Memory) 13; a display unit 14; a ROM (Read Only Memory) 15; a communication unit 16; a storage unit 17; and a scanner unit 18 as an acquiring unit.

The units of the information terminal 10 are connected with one another via a bus 19.

The CPU 11 controls each unit of the information terminal 10. The CPU 11 reads a specified program among various programs from the ROM 15, expands the read program into the RAM 13, and performs various processes in cooperation with the expanded program.

The CPU 11 detects an application with focus from running applications according to a first symbol reading program 151, makes a symbol scanner driver 152 decode a symbol image scanned by the scanner unit 18 with the setting corresponding to the detected application, and outputs the acquired symbol data or the output data corresponding to the acquired symbol data to the detected application.

The operation unit 12 includes a key group having, for example, a trigger key for scanning by the scanner unit 18, character input keys, and function keys. The operation unit 12 receives an input through a key from a user, and outputs to the CPU 11 operation information according to the input.

The operation unit 12 may include a touch panel provided on the screen of the display unit 14 to receive a touch input from a user.

The RAM 13 is a volatile semiconductor memory and includes a work area to store various types of data and various programs.

The display unit 14 includes a display panel, such as an LCD (Liquid Crystal Display) and an EL (Electro Luminescent) display. The display unit 14 performs various displays on the display panel in accordance with display information inputted by the CPU 11.

The ROM 15 is a read-only semiconductor memory storing various types of data and various programs. The ROM 15 stores the first symbol reading program 151, the symbol scanner driver 152 and a symbol scanner library 153.

The first symbol reading program 151 is a program for executing a first symbol reading process described below.

The symbol scanner driver 152 is a program for controlling the scanner unit 18.

The CPU 11 serves as the decoding unit which controls the scanner unit 18 and decodes a symbol image acquired by the scanner unit 18 in accordance with the symbol scanner driver 152.

For the symbol scanner driver 152, the setting for a decoding method of a symbol can be made. Specifically, the decoding method includes the type of symbol to be read and the number of digits of symbol data to be read.

The symbol data is the data of character string obtained by decoding a symbol image acquired by the scanner unit 18.

The CPU 11 with the symbol scanner driver 152 running is capable of determining whether the symbol image acquired by the scanner unit 18 corresponds to a set symbol to be read.

When the symbol image corresponds to the set symbol to be read, the CPU 11 with the symbol scanner driver 152 running outputs the symbol data, which is the results of decoding of the symbol image, to the symbol scanner library 153 (i.e., the CPU 11 with the symbol scanner library 153 running). When the symbol image does not correspond to the set symbol to be read, the CPU 11 does not output the symbol data as the decoding results.

The symbol scanner library 153 is a program component through which data is exchanged between the CPU 11 with the symbol scanner driver 152 running and the first symbol reading process (i.e., the CPU 11 with the first symbol reading program 151 running) as a higher-level layer.

Specifically, the CPU 11 with the symbol scanner library 153 running delivers configuration information set in the first symbol reading process to the symbol scanner driver 152 (i.e., the CPU 11 with the symbol scanner driver 152 running), and outputs the symbol data outputted from the symbol scanner driver 152 (i.e., the CPU 11 with the symbol scanner driver 152 running) to the first symbol reading process.

The communication unit 16 is a wireless communication unit which performs wireless LAN communications.

In a shop using the information terminal 10, for example, access points (not shown) are set up. The communication unit 16 performs a wireless communication with the access points, and performs a communication with a device such as a server in the shop via the access points.

The communication unit 16 may include a communication unit which performs a communication through wire, such as a USB through a cradle and LAN.

The storage unit 17 is a non-volatile memory such as a flash memory and an EEPROM (Electrically Erasable Programmable ROM) where information can be written and read, and a RAM backed up with a battery. The storage unit 17 stores a configuration file 20 and a product information database 30 described later.

Further, the storage unit 17 stores the programs for the applications A, B and C.

The applications A, B and C are business applications each of which performs a process using the results of the symbol reading by the scanner unit 18. For example, the application A is a handbook viewer which displays the image of the product corresponding to a read symbol.

The application B is an inventory tool which displays inventory information, in the shop, of the products in all sizes for the product corresponding to a read symbol. The application C is a browser which displays a home page explaining the product corresponding to a read symbol.

The applications stored in the storage unit 17, however, are not limited to the applications A, B and C. The number and the content of the applications may be changed.

The scanner unit 18 is an image scanner which images and scans a symbol as a subject in accordance with the control by the CPU 11. The scanner unit 18 includes an optical system, such as a lens; an imaging element, such as a CCD (Charge Coupled Device Image) and a CMOS (Complementary Metal Oxide Semiconductor); and a control section.

The imaging element of the scanner unit 18 senses an image of a symbol as a subject incident through the optical system, and converts the image into image data as electrical signals.

The control section of the scanner unit 18 performs operational control related to the imaging by the scanner unit 18.

The control section outputs the image data of the symbol, which is outputted from the imaging element, to the RAM 13 as a symbol image.

The information terminal 10 includes a power source unit (not shown) including a secondary battery or a primary battery to supply power to each unit in the information terminal 10.

Next, the information stored in the storage unit 17 is described with reference to FIGS. 2, 3A and 3B.

FIG. 2 is a view showing the configuration file 20.

FIG. 3A is a view showing the product information database 30.

FIG. 3B is a view showing an inventory information database 40.

The configuration file 20 includes various types of configuration information related to symbol reading for each application stored in the storage unit 17.

As shown in FIG. 2, the configuration file 20 includes the items of a program name, a DB file, a DB field, a reading code and a reading digit number and their respective data for each application. The program name in the configuration file 20 is the file name of the program of an application.

The DB file in the configuration file 20 is the file name of the database where the output data corresponding to an application is stored. "Database1.dat" is the DB file name of the product information database 30, and "Database2.dat" is the DB file name of the inventory information database 40.

The DB field in the configuration file 20 is the field name of the output data to be outputted to an application among the fields of the database corresponding to the DB file.

The reading code in the configuration file 20 is the standard name of the symbol to be read for an application. The reading digit number in the configuration file 20 is the number of digits of the symbol data of the symbol to be read for an application.

The product information database 30 is a database including the information related to the products corresponding to symbol data.

As shown in FIG. 3A, the product information database 30 includes the fields of symbol data 31, a product code 32, a product name 33 and an image file 34.

The symbol data 31 is the symbol data of a read symbol.

The product code 32 is an identification code of the product corresponding to the symbol data 31.

The product code 32 is set in such a way that different products have different values and that different sizes have different values for the same product.

The product name 33 is the name of the product corresponding to the symbol data 31, and includes the size of the product. The image file 34 is the image file name of the product corresponding to the symbol data 31.

Each image file in the image file 34 is stored in the storage unit 17 in advance.

The inventory information database 40 is a database including the information of the amount of products in stock corresponding to symbol data in the shop.

As shown in FIG. 3B, the inventory information database 40 includes the fields of symbol data 41, a (stock) product code 42, a (stock) product name 43, a stock amount (S) 44, a stock amount (M) 45, a stock amount (L) 46 and a stock amount (LL) 47.

The symbol data 41 is the symbol data of a read symbol.

The (stock) product code 42 is the identification code of the product corresponding to the symbol data 41.

The (stock) product code 42 is set in such a way that different products have different values and that the same product has the same value for all sizes.

The (stock) product name 43 is the name of the product corresponding to the symbol data 41, and does not include a size.

The stock amount (S) 44 is the amount of the S-size products in stock corresponding to the symbol data 41.

The stock amount (M) 45 is the amount of the M-size products in stock corresponding to the symbol data 41.

The stock amount (L) 46 is the amount of the L-size products in stock corresponding to the symbol data 41.

The stock amount (LL) 47 is the amount of the LL-size products in stock corresponding to the symbol data 41.

Next, the behavior of the information terminal 10 is described with reference to FIGS. 4, 5A, 5B and 5C.

FIG. 4 is a flowchart showing the first symbol reading process.

FIG. 5A is a view showing a display screen 51 of application A.

FIG. 5B is a view showing a display screen 52 of application B.

FIG. 5C is a view showing a display screen 53 of application C.

The first symbol reading process executed in the information terminal 10 is a process which detects an application with focus from running applications, reads a symbol using the scanner unit 18 and the symbol scanner driver 152 with the setting corresponding to the detected application, and outputs the data to the detected application.

After the information terminal 10 is powered on, for example, start-up of an OS (Operating System) triggers the execution of the first symbol reading process by the CPU 11. The CPU 11 executes the first symbol reading process in cooperation with the first symbol reading program 151 read from the ROM 15 and expanded as appropriate in the RAM 13.

Further, in the information terminal 10, the CPU 11 reads the program of an application to be started from the storage unit 17 in accordance with the instruction to start up the application, the instruction being inputted through the operation unit 12 by a user (i.e., clerk), expands the read program into the RAM 13, and executes the application in cooperation with the expanded program of the application, while the OS is running.

Here, at least one application is running. Thus, the OS running in the information terminal 10 is a multitasking OS which enables a plurality of applications to run at the same time.

The OS of the information terminal 10 displays an application with focus in the foreground on the display screen of the display unit 14.

The application with focus (i.e., active application) is an application which is currently selected to receive an input on a GUI (Graphical User Interface).

A user can visually confirm only the application with focus.

That is because the display screen of the display unit 14 of the information terminal 10 is not large enough to display more than one application.

The first symbol reading process (first symbol reading program 151) is a resident process (program) at the back of the display screen of the display unit 14.

As shown in FIG. 4, the CPU 11 first receives an input through the trigger key for symbol scanning pressed by a user (Step S11).

In Step S11, the trigger key is waiting for the inputting (pressing). When the trigger key is pressed in Step S11, the CPU 11 detects the application displayed in the foreground on the display unit 14 among running applications, as an application with focus (Step S12).

The CPU 11 refers to the configuration file 20 stored in the storage unit 17 to read, from the configuration file 20, the configuration information for the application detected in Step S12 (Step S13).

The CPU 11 reflects the configuration information read in Step S13 (i.e., the reading code and reading digit number of the symbol to be read) in the setting for decoding method in the symbol scanner driver 152 (Step S14).

The CPU 11 makes the scanner unit 18 image a symbol; makes the symbol scanner driver 152 decode the acquired image data as a symbol image; and acquires, through the symbol scanner library 153, the symbol data outputted from the symbol scanner driver 152 (Step S15).

In Step S15, symbol data is acquired when the symbol image corresponds to the configuration information set in Step S14; and symbol data is not acquired when the symbol image does not correspond to the configuration information set in Step S14.

The CPU 11 determines whether the symbol data is acquired in Step S15 and reading of the symbol has succeeded (Step S16). If reading of the symbol has not succeeded (Step S16: NO), the process goes to Step S11.

If reading of the symbol has succeeded (Step S16: YES), the CPU 11 refers to the DB name in the configuration information read in Step S13 to determine whether a database corresponding to the symbol is specified (Step S17).

If a database corresponding to the symbol is specified (Step S17: YES), the CPU 11 reads the database corresponding to the symbol from the storage unit 17, and searches for the record of the database by the symbol data acquired in Step S15 (Step S18).

The CPU 11 determines whether the record is found in Step S18 (Step S19). If the record is not found (Step S19: NO), the process goes to Step S11.

If the record is found (Step S19: YES), the CPU 11 reads the data of DB field in the configuration information acquired in Step S13 among the fields of the record found in Step S18, outputs the read data to the input field of the foreground application detected in Step S12 (Step S20). Then, the process goes to Step S11.

If a database corresponding to the symbol is not specified (Step S17: NO), the CPU 11 outputs the symbol data acquired in Step S15 to the input field of the foreground application detected in Step S12 (Step S21). Then, the process goes to Step S11.

Next, an illustrative example of the first symbol reading process is described with reference to FIG. 5. The explanations are made on the assumption that applications A, B and C are running in the information terminal 10.

The case where the display screen 51 of application A is shown in the foreground on the display unit 14 and where a bar code (JAN code) attached to a product is read is described, as shown in FIG. 5A.

The display screen 51 includes an input field 51*a*, a display button 51*b* and a main display 51*c*. At first, nothing is displayed in the input field 51*a* and the main display 51*c*.

When the trigger button of the operation unit 12 is pressed in Step S11, the application A is detected in Step S12 and the configuration information of the application A in the configuration file 20 is acquired in Step S13 in the first symbol reading process.

Then, a bar code (JAN code) is scanned and decoded, and the symbol data thereof is acquired in Step S15.

Then, in Step S18, the record of symbol data 31 of the acquired symbol data in the product information database 30 is searched for, which database 30 has a DB name of Database1.dat in the configuration information.

The DB field in the configuration information is a product code, and "10000001", which is the data of the product code 32 in the found record, is outputted to the input field 51*a* as input characters to be displayed in Step S20.

When the display button 51*b* is pressed, the application A refers to the product information database 30, and the image file of the image file 34 in the detected record is read from the storage unit 17. The product information including the image, the product code and the product name 33 of the image file is displayed on the main display 51*c*.

In conventional information terminals, when product information is searched for to be displayed on the basis of the data of a read bar code, the raw data of the bar code data needs to be displayed in the input field of an application before searching a database.

That is, when only product information is necessary, the input field for bar code data needs to be prepared on the screen of the application.

In contrast, in the information terminal 10 of the present embodiment, the product code itself of a read symbol is outputted to the input field 51*a* on the display screen 51.

Next, the case where the display screen 52 of application B is shown in the foreground on the display unit 14 and where a bar code (Code39) attached to a product is read is described, as shown in FIG. 5B.

The display screen 52 includes an input field 52*a*, a search button 52*b* and a main display 52*c*. At first, nothing is displayed in the input field 52*a* and the main display 52*c*.

When the trigger button of the operation unit 12 is pressed in Step S11, the application B is detected in Step S12 and the configuration information of the application B in the configuration file 20 is acquired in Step S13 in the first symbol reading process. Then, a bar code (Code39) is scanned and decoded, and the symbol data thereof is acquired in Step S15.

Then, in Step S18, the record of symbol data 41 of the acquired symbol data in the inventory information database 40 is searched for, which database 40 has a DB name of Database2.dat in the configuration information.

The DB field in the configuration information is a (stock) product name, and "blue shirt", which is the data of the (stock) product name 43 in the found record, is outputted to the input field 52*a* as input characters to be displayed in Step S20.

When the search button 52*b* is pressed, the application B refers to the inventory information database 40, and the inventory information including the (stock) product name 43, the (stock) product code 42, the stock amount (S) 44, the stock amount (M) 45, the stock amount (L) 46 and the stock amount (LL) 47 is displayed on the main display 52*c*.

That is, in the information terminal 10, the product name itself of a read symbol is outputted to the input field 52*a* on the display screen 52.

Next, the case where the display screen 53 of application C is shown in the foreground on the display unit 14 and where a QR code (registered trademark) attached to a product is read is described, as shown in FIG. 5C.

The display screen 53 includes an input field 53*a*, a display button 53*b* and a main display 53*c*.

At first, nothing is displayed in the input field 53*a* and the main display 53*c*.

When the trigger button of the operation unit 12 is pressed in Step S11, the application C is detected in Step S12 and the configuration information of the application C in the configuration file 20 is acquired in Step S13 in the first symbol reading process.

Then, a QR code is scanned and decoded, and the symbol data "www.ΔΔ.jp/3001" of the QR code is acquired in Step S15. The symbol data "www.ΔΔ.jp/3001" is a URL (Uniform Resource Locator) of the home page explaining the product to which the QR code is attached.

Then, in Step S17, it is determined that the DB name in the configuration information does not have a value and that a database is not specified. The symbol data "www.ΔΔ.jp/3001" itself acquired in Step S15 is outputted to the input field 53*a* as input characters to be displayed in Step S21.

When the display button 53*b* is pressed, the application C allows the information terminal 10 to connect to the Internet through the communication unit 16. The data of the home page having a URL of "www.ΔΔ.jp/3001" is downloaded from a Web server to be displayed on the main display 53*c*.

According to the present embodiment, the CPU 11 of the information terminal 10 detects (specifies) an application with focus from running applications, reads the configuration information of the specified application from the configuration file 20 in the storage unit 17, and sets the decoding method of a symbol in accordance with the read configuration information, through the execution of the first symbol reading process.

The symbol scanner driver 152 as a decoding unit decodes the symbol image acquired by the scanner unit 18 on the basis of the set decoding method of a symbol, and acquires symbol data.

Therefore, a symbol can be read with the setting (decoding method) corresponding to each application, and the structure of each application can be simplified.

This reduces the load of application development and reduces the operation load of application since the application does not perform reading of a symbol. Further, an application to scan a symbol can be selected appropriately from running applications.

Further, the CPU 11 of the information terminal 10 specifies the application displayed in the foreground on the display screen of the display unit 14, as an application with focus. Therefore, an application to scan a symbol can be selected more appropriately from running applications.

Further, the storage unit 17 stores the product information database 30 and the inventory information database 40, and the configuration file 20 includes database specification information on a database (DB file) and output format specification information on an output format (DB field) for each application.

The CPU 11 specifies one of the product information database 30 and the inventory information database 40 in accordance with the database specification information for the specified application. The CPU 11 acquires, from the specified database, the output data in the field (output format) corresponding to the symbol data acquired by the symbol scanner driver 152 in accordance with the output format specification information for the specified application. The CPU 11 outputs the output data to the specified application.

Therefore, an application does not have to perform a separate process, such as a search, in order to convert symbol data into output data in an intended output format. This can simplify the structure of application and can reduce the processing load of application. Further, each application can easily acquire the output data corresponding to the symbol data in a predetermined output format.

Further, the CPU 11 outputs the output data in the output format corresponding to the symbol data acquired by the symbol scanner driver 152 to the input field of the specified application.

Therefore, the application does not have to prepare an input field for symbol data on the display screen, which makes the structure of application simpler.

Further, the CPU 11 outputs the symbol data acquired by the symbol scanner driver 152 to the specified application when a database is not specified in the database specification information for the specified application. Therefore, an application which requires symbol data itself can easily acquire the symbol data.

(Modification)

A modification of the above-described embodiment is described with reference to FIGS. 6 and 7.

FIG. 6 is a view showing a configuration file 60.

Figure 7:
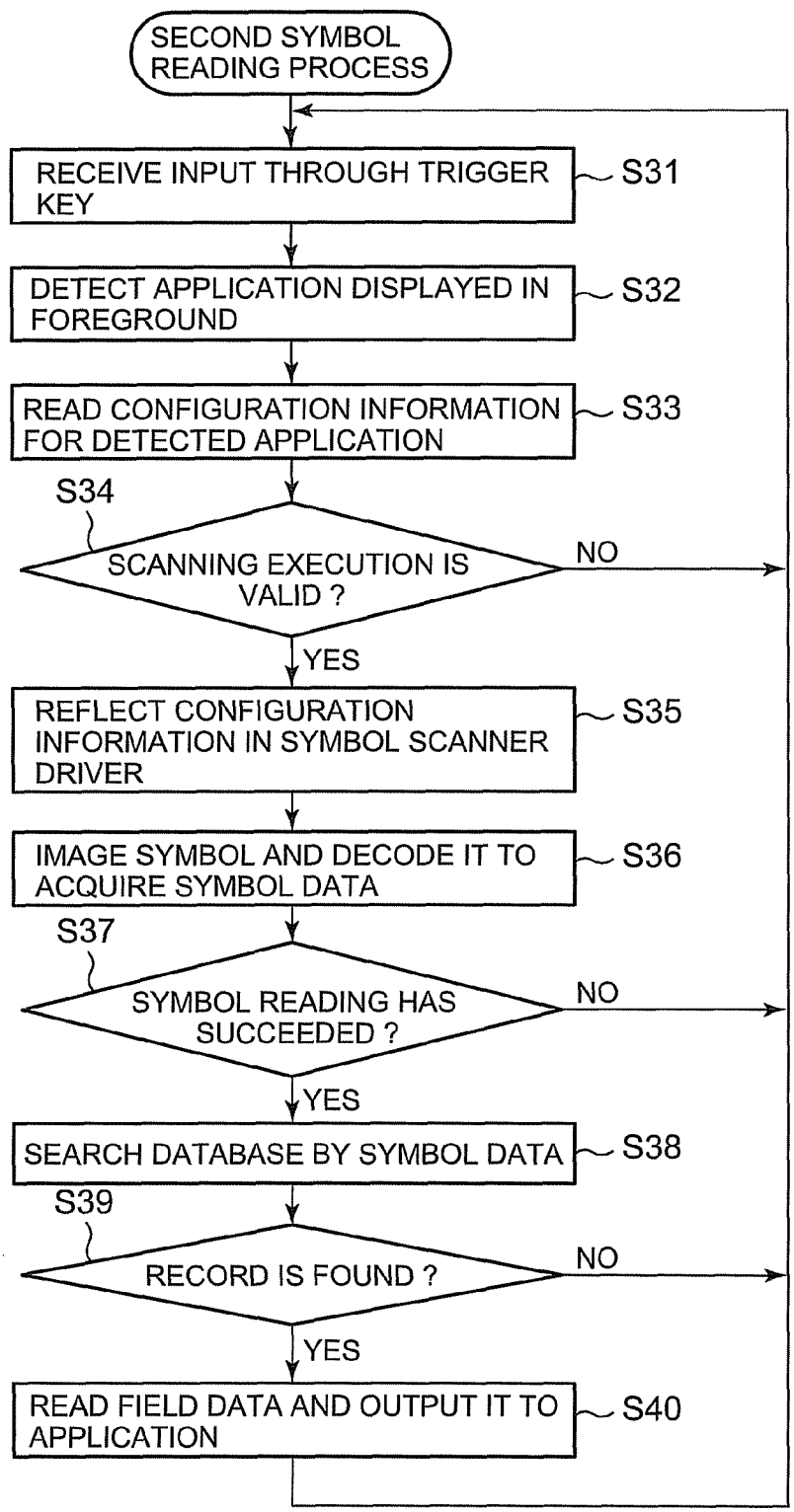
FIG. 7 is a flowchart showing a second symbol reading process.

FIG. 7 is a flowchart showing a second symbol reading process.

The information terminal 10 of the above-described embodiment is used as the device of the modification. In a ROM 15, however, a second symbol reading program is stored instead of the first symbol reading program 151; and in a storage unit 17, the configuration file 60 shown in FIG. 6 is stored instead of the configuration file 20.

The configuration file 60 includes various types of configuration information for each application stored in the storage unit 17.

As shown in FIG. 6, the configuration file 60 includes the items of a program name, scanning execution, a DB file, a DB field, a reading code and a reading digit number and their respective data for each application.

The scanning execution in the configuration file 60 is the information indicating whether the application is to execute scanning, and takes the value of "valid" or "invalid".

In the information terminal 10 of the modification, applications A, B and D can be running at the same time.

Each of the applications A and B is an application which performs scanning of a symbol of a JAN code and Code39, as in the above-described embodiment.

The application D is an application which does not perform scanning of a symbol and is a business-oriented mailer, for example.

The application D, however, is not limited thereto but may be another application such as a usual photographing application to photograph scenes and people with a scanner unit 18.

Next, the second symbol reading process is described with reference to FIG. 7.

After the information terminal 10 is powered on, for example, start-up of an OS triggers the execution of the second symbol reading process by the CPU 11. The CPU 11 executes the second symbol reading process in cooperation with the second symbol reading program read from the ROM 15 and expanded as appropriate in a RAM 13.

In the information terminal 10, at least one application has been started up in advance while the OS is running.

As shown in FIG. 7, Steps S31 to S33 in the second symbol reading process are the same as Steps S11 to S13 in the first symbol reading process of the above-described embodiment.

The CPU 11 refers to scanning specification information in the configuration information read in Step S33 and determines whether the scanning execution is valid (Step S34). If the scanning execution is invalid (Step S34: NO), the process goes to Step S31.

If the scanning execution is valid (Step S34: YES), the process goes to Step S35. Steps S35 to S40 are the same as Steps S14 to S16 and S18 to S20 in the first symbol reading process.

As described above, according to the modification, the configuration file 60 includes the scanning specification information indicating whether scanning of a symbol is to be executed by the scanner unit 18 for each application, and the CPU 11 determines whether to execute scanning with the scanner unit 18 in accordance with the scanning specification information for a detected (specified) application. When scanning is to be executed, the CPU 11 makes the scanner unit 18 execute the scanning; and when scanning is not to be executed, the CPU 11 does not make the scanner unit 18 execute the scanning.

Therefore, when an application with focus does not require scanning execution, unnecessary scanning and decoding are avoided.

In the above descriptions, the ROM 15 is used as a computer readable medium having stored thereon the program according to the present invention. The computer readable medium, however, is not limited thereto.

Alternatively, a computer readable medium may be a non-volatile memory (the storage unit 17, for example) such as a flash memory or a portable recording medium such as a compact disk read only memory (CD-ROM).

Alternatively, a carrier wave may be applied to the present invention as a medium to provide program data according to the present invention via a communication line.

The above-described embodiment and modification are examples of the information terminal and program according to the present invention, but the present invention is not limited thereto.

While the scanner unit 18 in the above-described embodiment and modification is an image scanner, the scanner unit 18 is not limited thereto but may be another scanner unit such as a laser scanner.

The laser scanner scans a bar code with laser light and outputs binarized data (bar code image) as a symbol image indicating the widths of white spaces and black bars of the bar code.

The symbol scanner driver decodes the outputted symbol image to acquire symbol data, and the symbol scanner library outputs the symbol data to the first or second symbol reading process (i.e., the CPU 11 to execute the first or second symbol reading process).

Further, in the above-described embodiment and modification, the CPU 11 of the information terminal 10 outputs symbol data or the output data in the field of the database corresponding to the symbol data to the foreground application in the first or second symbol reading process. The configuration, however, is not limited thereto.

The CPU 11 may output symbol data or the output data in the field of the database corresponding to the symbol data to an application with focus through a clipboard of the OS, for example.

Further, the symbol scanner driver may output the symbol data to the first or second symbol reading process (i.e., the CPU 11 to execute the first or second symbol reading process) without involving the symbol scanner library.

Further, while the symbol scanner driver 152 in the above-described embodiment and modification is software, the symbol scanner driver 152 is not limited thereto.

Alternatively, a decoding unit having the same function as the symbol scanner driver 152 may be included as hardware in the scanner unit 18.

Further, while an application with focus is displayed in the foreground in the above-described embodiment and modification, the configuration is not limited thereto.

Alternatively, an application for which an input operation to focus on the application has been performed may be detected (specified) as an application with focus regardless of the display position of the application, for example.

It should be understood that the detailed configuration and operation of each component of the information terminal 10 of the above-described embodiment and modification may be modified as appropriate without departing from the scope of the present invention.

The scope of the present invention is not limited to the embodiments described above, but covers the scope of the claims and its equivalents.

The entire disclosure of Japanese Patent Application No. 2012-161652 filed on Jul. 20, 2012 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An information terminal comprising:
    an acquiring unit which scans a symbol to acquire a symbol image;
    a storage unit which stores pieces of configuration information on a decoding method of the symbol for respective applications;
    a specifying unit which specifies an application of the applications;
    a reading unit which reads a piece of configuration information for the specified application from the pieces of configuration information stored in the storage unit;
    a setting unit which sets the decoding method in accordance with the piece of configuration information read by the reading unit; and
    a decoding unit which decodes the symbol image acquired by the acquiring unit on the basis of the set decoding method to acquire symbol data.

2. The information terminal according to claim 1, wherein the specifying unit specifies an application with focus among at least one running application of the applications.

3. The information terminal according to claim 2, further comprising a display unit which displays the at least one running application,
    wherein the specifying unit specifies, as the application with focus, an application displayed in a foreground on a display screen of the display unit.

4. The information terminal according to claim 1,
    wherein the storage unit stores a database including the symbol data and output data in an output format associated with the symbol data and stores database specification information on the database and output format specification information on the output format for each of the applications;
    wherein the reading unit reads, from the storage unit, the database specification information and the output format specification information for the application specified by the specifying unit; and
    wherein the information terminal further comprises an output unit which specifies the database stored in the storage unit in accordance with the read database specification information; reads, from the specified database, the output data in the output format corresponding to the symbol data acquired by the decoding unit in accordance with the read output format specification information; and outputs the read output data to the specified application.

5. The information terminal according to claim 4, wherein the output unit outputs the output data to an input field of the application specified by the specifying unit.

6. The information terminal according to claim 4, wherein the output unit outputs the symbol data acquired by the decoding unit to the specified application when the database is not specified in the database specification information for the application specified by the specifying unit.

7. The information terminal according to claim 1, wherein the storage unit stores scanning specification information indicating whether to execute scanning of the symbol with the acquiring unit for each of the applications; and
wherein the information terminal further comprises:
a determining unit which determines whether to make the acquiring unit execute the scanning in accordance with the scanning specification information for the application specified by the specifying unit, and
a control unit which makes the acquiring unit execute the scanning when it is determined that the scanning is to be executed as a result of a determination made by the determining unit, and does not make the acquiring unit execute the scanning when it is determined that the scanning is not to be executed as the result of the determination.

8. A non-transitory computer readable medium having stored thereon computer-executable instructions which, when executed, cause a computer to perform steps of:
scanning a symbol to acquire a symbol image;
storing pieces of configuration information on a decoding method of the symbol for respective applications on a storage unit;
specifying an application of the applications;
reading a piece of configuration information for the specified application from the pieces of configuration information stored in the storage unit;
setting the decoding method in accordance with the piece of configuration information read by the reading unit; and
decoding the symbol image acquired by the scanning of the symbol on the basis of the set decoding method to acquire symbol data.

9. The information terminal according to claim 1, wherein the storage unit stores, as the pieces of configuration information, a plurality of combinations of information indicating a type of the symbol and information indicating a reading digit number.

10. An information terminal comprising:
an acquiring unit which scans a symbol to acquire a symbol image;
a storage unit which stores configuration information on a decoding method of the symbol for each of applications;
a specifying unit which specifies an application of the applications;
a reading unit which reads, from the storage unit, the configuration information on the decoding method for the specified application;
a setting unit which sets the decoding method in accordance with the read configuration information; and
a decoding unit which decodes the symbol image acquired by the acquiring unit on the basis of the set decoding method to acquire symbol data,
wherein the storage unit stores scanning specification information indicating whether to execute scanning of the symbol with the acquiring unit for each of the applications; and
wherein the information terminal further comprises:
a determining unit which determines whether to make the acquiring unit execute the scanning in accordance with the scanning specification information for the application specified by the specifying unit, and
a control unit which makes the acquiring unit execute the scanning when it is determined that the scanning is to be executed as a result of a determination made by the determining unit, and does not make the acquiring unit execute the scanning when it is determined that the scanning is not to be executed as the result of the determination.

* * * * *